United States Patent
Abdollahian et al.

(10) Patent No.: US 9,536,335 B2
(45) Date of Patent: Jan. 3, 2017

(54) USING FREQUENCY DECOMPOSITION FOR BETTER COLOR CONSISTENCY IN A SYNTHESIZED REGION

(71) Applicant: SONY CORPORATION, Tokyo (JP)

(72) Inventors: Golnaz Abdollahian, San Francisco, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/662,520

(22) Filed: Mar. 19, 2015

(65) Prior Publication Data
US 2016/0275708 A1    Sep. 22, 2016

(51) Int. Cl.
| | |
|---|---|
| G06T 11/00 | (2006.01) |
| G06T 11/60 | (2006.01) |
| G06T 3/40 | (2006.01) |
| G06K 9/62 | (2006.01) |

(52) U.S. Cl.
CPC ............ *G06T 11/60* (2013.01); *G06K 9/6201* (2013.01); *G06T 3/4007* (2013.01); *G06T 11/001* (2013.01)

(58) Field of Classification Search
CPC combination set(s) only.
See application file for complete search history.

(56) References Cited

U.S. PATENT DOCUMENTS

| | | | |
|---|---|---|---|
| 6,762,769 B2 | 7/2004 | Guo et al. | |
| 7,142,253 B2 | 11/2006 | Weitbruch et al. | |
| 7,171,057 B1 * | 1/2007 | Wilensky | G06T 15/503 345/629 |
| 7,418,131 B2 | 8/2008 | Wang | |
| 7,454,087 B1 | 11/2008 | Wilensky et al. | |
| 7,512,288 B1 * | 3/2009 | Wilensky | G06T 3/4007 382/284 |
| 7,551,181 B2 | 6/2009 | Criminisi et al. | |
| 7,755,645 B2 | 7/2010 | Sun et al. | |
| 8,249,365 B1 * | 8/2012 | Winnemoeller | G06T 11/001 382/181 |
| 8,249,394 B2 | 8/2012 | Peleg et al. | |
| 8,280,227 B2 | 10/2012 | Tsai et al. | |
| 8,374,462 B2 | 2/2013 | Jiang et al. | |
| 8,571,328 B2 | 10/2013 | Shechtman et al. | |
| 8,660,305 B2 | 2/2014 | Herling et al. | |

(Continued)

OTHER PUBLICATIONS

European Patent Office (EPO), European Search Report, Nov. 4, 2016, related EP Application No. EP16163818.6, pp. 1-13, with claims searched, pp. 14-16.

(Continued)

*Primary Examiner* — Anand Bhatnagar
(74) *Attorney, Agent, or Firm* — O'Banion & Ritchey LLP; John P. O'Banion

(57) ABSTRACT

A method and apparatus for synthesis of homogeneous regions when infilling a missing region, such as for inpainting removed (or moved) objects from the image is presented. A color interpolation process is performed across opposing boundaries of the missing region for directing the color selection in the patch matching process. Patch matching is performed based on using a detail layer modified by information from color interpolation for each target patch which fills from the extremity of the missing region in towards its center.

19 Claims, 5 Drawing Sheets

(56) References Cited

U.S. PATENT DOCUMENTS

| | | | |
|---|---|---|---|
| 8,787,698 B2* | 7/2014 | Winnemoeller | G06T 11/001 |
| | | | 345/156 |
| 2003/0164838 A1 | 9/2003 | Guo et al. | |
| 2005/0141780 A1* | 6/2005 | Takahashi | G06T 5/009 |
| | | | 382/260 |
| 2006/0045372 A1 | 3/2006 | Wang et al. | |
| 2006/0238543 A1* | 10/2006 | Fukao | H04N 1/6058 |
| | | | 345/593 |
| 2008/0170807 A1 | 7/2008 | Kokemohr | |
| 2008/0303951 A1* | 12/2008 | Nakayama | G06T 5/002 |
| | | | 348/607 |
| 2011/0268426 A1* | 11/2011 | Kikuchi | G11B 27/034 |
| | | | 386/278 |
| 2013/0113884 A1 | 5/2013 | Leontaris et al. | |
| 2013/0121608 A1* | 5/2013 | Winnemoeller | G06T 11/001 |
| | | | 382/263 |
| 2013/0121613 A1* | 5/2013 | Winnemoeller | G06T 11/001 |
| | | | 382/275 |
| 2013/0127844 A1 | 5/2013 | Koeppel | |
| 2013/0182184 A1 | 7/2013 | Senlet et al. | |
| 2014/0064614 A1 | 3/2014 | Hung et al. | |
| 2014/0376807 A1 | 12/2014 | Shechtman et al. | |
| 2015/0371105 A1* | 12/2015 | Yang et al. | G06K 9/4661 |
| | | | 348/136 |

OTHER PUBLICATIONS

Barnes, Connelly et al., "PatchMatch: A Randomized Correspondence Algorithm for Structural Image Editing", ACM Transactions on Graphics, vol. 28, No. 3, Article 24, Aug. 2009, published Jul. 27, 2009, pp. 24:1-24:11.

* cited by examiner

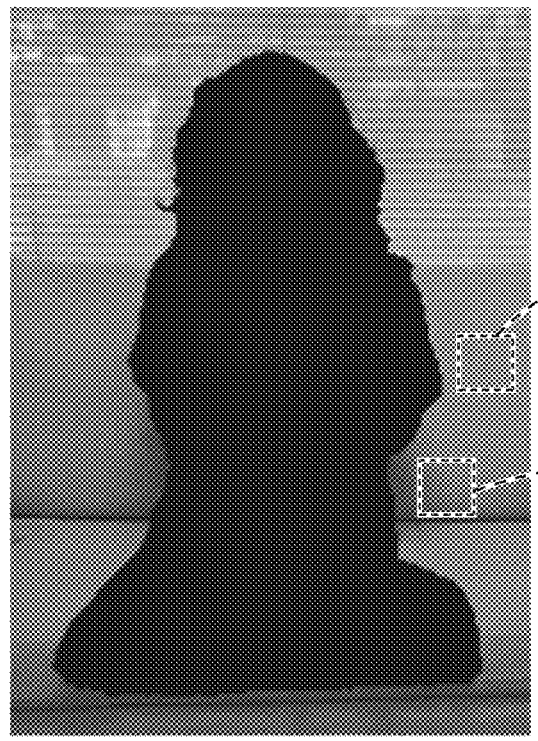
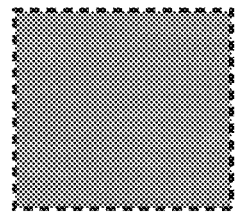
FIG. 1B
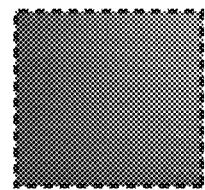
FIG. 1C
FIG. 1A
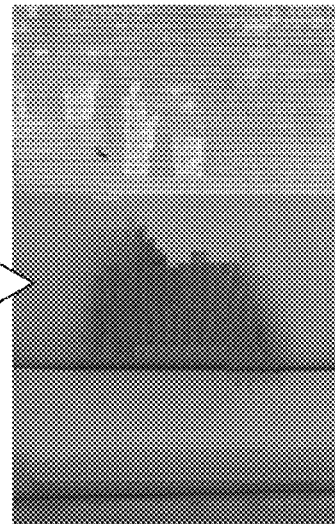
FIG. 1D

USING FREQUENCY DECOMPOSITION FOR BETTER COLOR CONSISTENCY IN A SYNTHESIZED REGION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technological Field

This disclosure pertains generally to image inpainting, and more particularly to synthesizing homogeneous areas of missing regions in a patch filling process controlled by color interpolation.

2. Background Discussion

In applications for digital image or video editing, one potential feature is that of allowing the user to remove an object (or a person) from a digital image or video. In such cases, the missing image region (hole) created by the object/person removal needs to be filled by the application, by proper content that fits the background. This process of automatic filling of the hole created by removing an object from a digital image or video is called inpainting.

The process of image inpainting involves reconstructing missing parts of an image frame, or video frame that have been destroyed or intentionally removed. If an object captured within an image is deleted, or moved, the area that was covered by (obscured by) that object in the original image, has to be reconstructed so that the resulting image still appears "natural" looking. That is to say that it is desirable that if the viewer has not seen the original image, they would be unable to notice that the image has been altered by removing, or moving an object.

There are a number of current inpainting techniques described in the literature. One of the shortcomings of these various techniques is in regard to how homogeneous regions are filled, as the synthesis process leaves visible discontinuities which can be readily apparent.

Accordingly, a need exists for a technique that provides synthesis of homogeneous region while reducing visible discontinuities.

BRIEF SUMMARY

An apparatus and method is presented that provides improved synthesis of homogeneous regions, in particular in an image with missing pixels, such as performed in the inpainting process. To reduce visible discontinuities, synthesis is performed using a color interpolation process so that patching is performed in a smooth manner across the width and/or height. Patch matching is then performed based on the color interpolation by utilizing a detail layer which is modified by a DC layer of the patch at the location of the target patch. Thus, DC-modified patches are used for filling the image holes in order to reduce discontinuity providing a smoother synthesis which is more visibly fitting with the image.

Further aspects of the disclosure will be brought out in the following portions of the specification, wherein the detailed description is for the purpose of fully disclosing preferred embodiments of the disclosure without placing limitations thereon.

BRIEF DESCRIPTION OF THE SEVERAL VIEWS OF THE DRAWING(S)

The disclosure will be more fully understood by reference to the following drawings which are for illustrative purposes only:

FIG. 1A through FIG. 1D are images showing difficult situations in original images being inpainted, and common inpainting errors, which are addressed according to the technology presented.

DETAILED DESCRIPTION

There are a number of considerations which are taken into account in this disclosure when synthesizing a homogeneous region, which by way of example may be performed during an inpainting process. In an inpainting process which takes into account adjacent structures, once the structures are reconstructed in a missing image region, the missing area is divided into one or a number of missing areas that are surrounded by homogeneous regions. These regions need to be synthesized to complete the process of inpainting. In one traditional way of patch filling, patches are filled around the boundaries to make the missing region smaller and the process continues until the entire missing area is filled. Variations in color or brightness in the boundary areas that are used for inpainting homogeneous areas can result in discontinuities, false edges, and visual artifacts in the synthesized region.

Such variations can be due to a change of brightness or color from one side of the removed object to the other side, caused by shadows, variance in illumination, or reflectance of nearby objects.

FIG. 1A through FIG. 1D depict a number of these issues. In FIG. 1A, the shadows create illumination changes, wherein the same fabric material appears significantly different between inset of FIG. 1B and inset of FIG. 1C. In FIG. 1D visible artifacts and discontinuities are seen in the image to the right after the inpainting process.

The disclosed technology minimizes these artifacts and improves visual quality of inpainting results in a homogeneous area.

Figure 2:
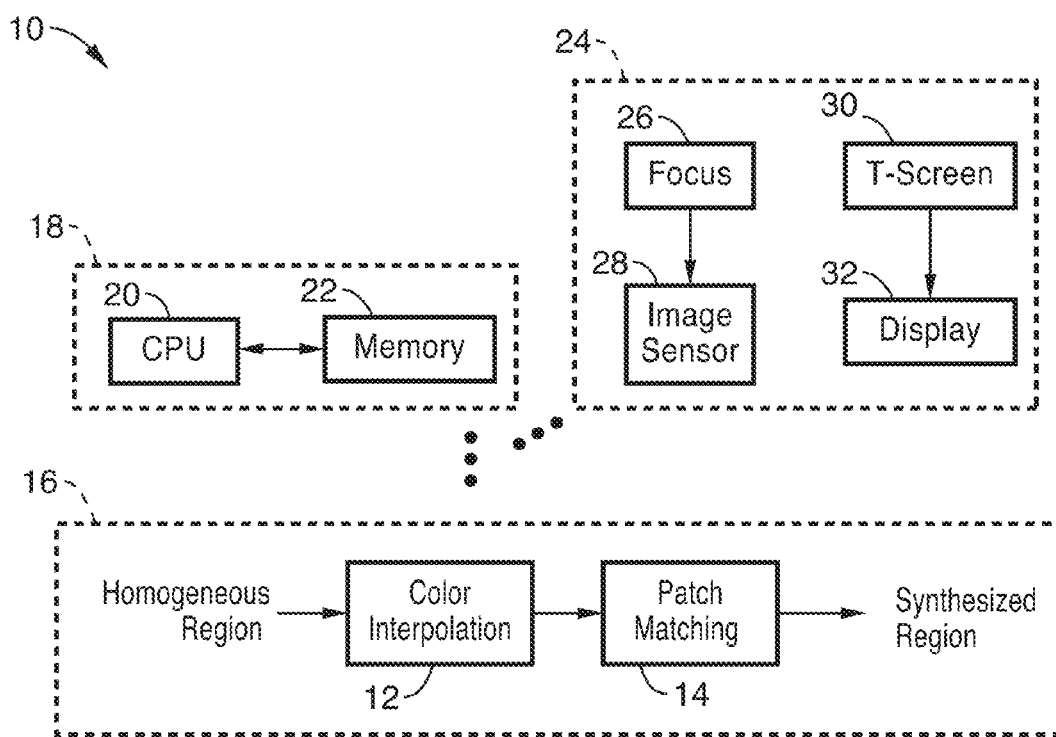
FIG. 2 is a block diagram of a system for synthesizing regions according to an embodiment of the technology presented.

FIG. 2 illustrates an example embodiment 10 of a system for synthesizing a homogeneous region. In this system, circuitry 16 performs color interpolation 12 on a homogeneous region, followed by patch matching 14 to generate a synthesized region.

It will be appreciated that generating a synthesized region is a digital image processing operation which can be performed by a wide range of digital electronic devices and systems. Synthesizing regions during an inpainting process can be performed in a variety of digital image processing circuits. These circuits may be selected from the group of digital circuits including computer processors, gate arrays, programmable logic circuits, application specific integrated circuits (ASICs), digital logic with sequential circuits, and combinations thereof. In at least one embodiment, this circuit is exemplified as a computer processor (e.g., CPU, microprocessor, microcontroller, computer enabled ASIC, etc.) and associated memory (e.g., RAM, DRAM, NVRAM, FLASH, computer readable media, etc.) for storing instructions of the computer processor(s). The instructions, when executed by the computer processor, perform steps in the described image processing. Accordingly, the figure is shown by way of example including image processing hardware 18, depicted as comprising one or more computer processors 20 and at least one memory 22. One of ordinary skill in the art will appreciate that certain other devices having logic and sequential functions, can be alternatively utilized without departing from the teachings of the present disclosure.

In the example of a computer processor, instructions stored in the memory are executed on the processor to perform the steps of the various homogeneous synthesis process steps described herein. Although, all these steps are preferably carried out by the computer processor, the processor, memory and instructions are not depicted in the remaining flow diagrams for the sake of simplicity of illustration. The presented technology is non-limiting with regard to memory and computer-readable media, insofar as these are non-transitory, and thus not constituting a transitory electronic signal.

In at least one embodiment, the apparatus comprises an image processing device configured for receiving a captured digital image, displaying the digital image on a display, allowing the user to select object elements seen on the display to be manipulated, selecting an image manipulation to be performed, and then to display the resultant manipulated image on the display. By way of example and not limitation, the manipulation may include the moving, or removal, of an object seen in the captured image, and the inpainting of the area from whence the object was moved/removed by synthesizing that region. Frequency decomposition is utilized in this process to provide improved consistency in synthesized regions of the manipulated image being output (displayed).

It should be appreciated that image processing functionality can be incorporated in various digital electronic devices, including digital electronic devices configured for image capturing and display (e.g., camera enabled electronic devices), such as a cameras, mobile phones having image capture capability, or similar image capturing devices. In this example embodiment, the device is shown to include image capture and display hardware and circuitry 24, exemplified with focusing mechanism 26 coupled to image sensor 28 for controlling image capture. A display 32 is shown upon which the captured images are displayed. A user input 30 is shown, such as including a touch screen (T-screen) 30 coupled to display 32, allowing the user to select image manipulation functions for the captured images. The touch screen allows the user to indicate their desired changes directly upon the captured image being displayed on the display 32. The digital electronic device configured for image capturing and display is configured with electronics to perform the frequency decomposition described in this disclosure to provide better color consistency in synthesized regions, such as a result of user selection of image processing which involves deleting, or moving, of objects seen in a captured image.

It will further be appreciated that the device on which the computer processor and memory operate for performing the image processing functions may be any computer-enabled electronic device, including but not limited to: cellular phones, digital cameras, palm tops, tablets, laptops, personal computers, server devices coupled for performing processing for other computer enabled devices, and various combinations thereof.

For inpainting the missing area in an image, the missing pixels are first interpolated using known areas at the boundary of the missing area. Although the disclosure speaks of the use of horizontal linear interpolation, it should be appreciated that vertical, and other types of interpolation may also be utilized without departing from the present teachings. Such interpolation, provides the general color of the missing area, but does not contain the details. The details are created through the patch matching approach. In the patch matching approach, for each target patch containing part of the missing area, several candidate patches are evaluated for providing the unknown details of the patch.

Figure 3:
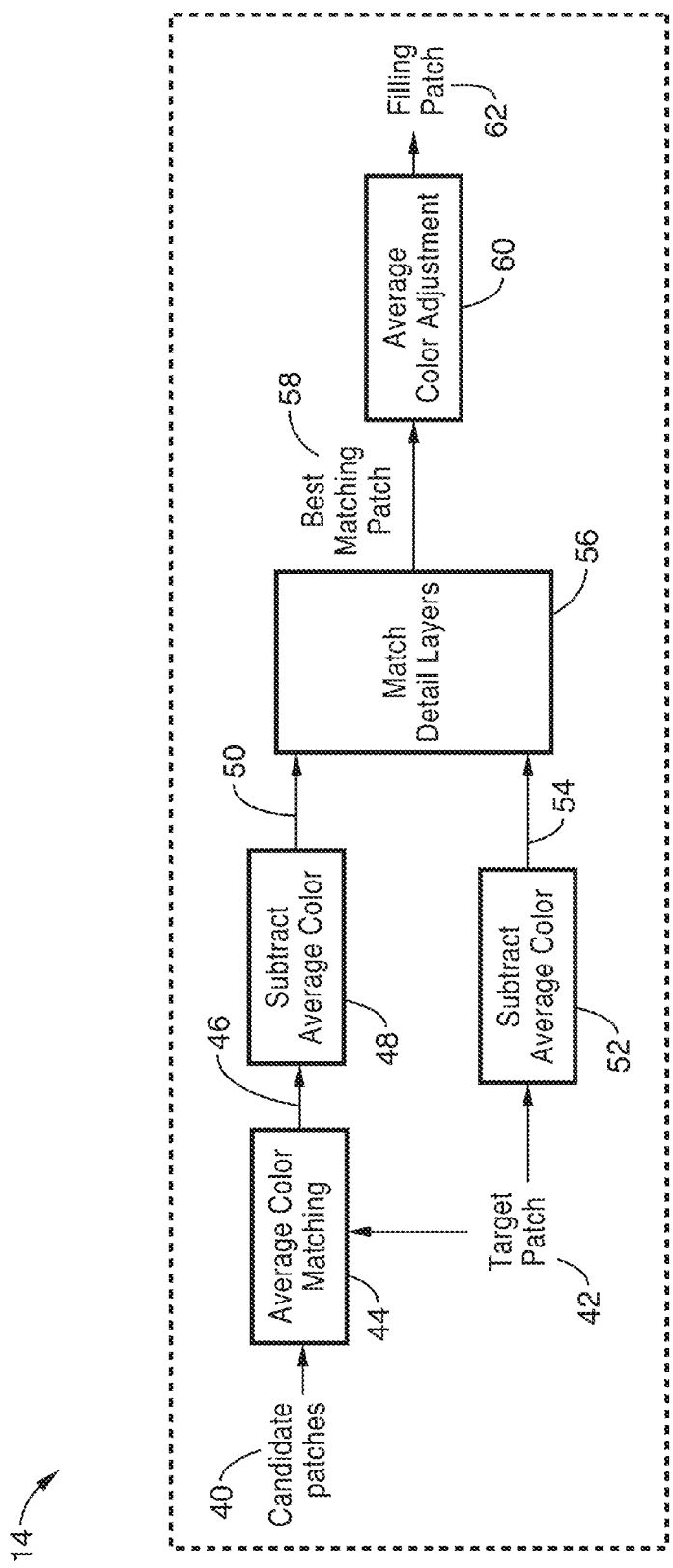
FIG. 3 is a block diagram of patch matching according to an embodiment of the technology presented.

FIG. 3 illustrates an example embodiment 14 of patch matching for the disclosed technology. Candidate patches 40 are received along with a target patch 42 for average color matching 44. In color matching 44, candidate patches whose averages are too far from the average of the target patch are rejected. The output 46 of the color matching 44 is made up of candidate patches whose average is close to the average of the target patch. Output 46 of average color matching 44 is received for subtracting average color 48 and outputting detail layer 50 for the non-rejected candidate patches. Target patch 42 is received to also subtract average color 52, and output detail layer 54 of the target patch. Detail layers of non-rejected candidate patches 50 and the detail layer of target patch 54 are received for matching detail layers 56, which outputs the best matching patch 58 for performing average color adjustment 60 which generates patch filling 62.

The above process requires determining the average color of all candidate patches. This determination can be performed efficiently using integral images computed for each of the color components. As the patch matching approach is intended to be used for estimating the details of the target block, and not its average color (because the average color is already determined through interpolation), the patch matching is performed after subtraction of the average values from all patches involved, i.e., the average value of each candidate patch is subtracted from the candidate patch, and the average value of the target patch is subtracted from the target patch. The target patch is typically made of two parts: (area "a") a part that is know from the original image or whose details are computed in previous steps, and (area "b") a part for which the details are not known, and whose pixels have the values of the interpolated color only. Patch matching requires computation of the distance each non-rejected candidate patch (after removal of its average) and the target patch (after removal of its average). This patch distance is calculated over the whole target patch (i.e., areas a and b above) and not just over area a. After finding the best matching patch, the average values are adjusted according to the color-filled image, and the resulting values are clipped to the valid range of pixel values, typically in the range from 0 to 255.

Color interpolation is performed for the missing region on a coarse level so that the transition from one side of the object to the other side of the object is smooth. For example, in at least one implementation, horizontal linear color interpolation was utilized, but this can be replaced with other interpolation methods like linear vertical interpolation, or linear interpolation in other directions. The direction of interpolation can also be based on the direction of the structure. It can also be based on a weighted average of vertical and horizontal interpolations, or a general two-dimensional interpolation. Accordingly, the present disclosure applies patch matching on the detail layer of the patches, after subtracting the average color, and then adjusts the average color of the best matching patch based on the color-interpolated image as was shown in FIG. 3.

Linear color interpolation, such as horizontal linear interpolation, first performs downsampling of the image (to lower resolution) by a factor of k. The factor k is typically a positive integer, preferably a power of 2, depending upon the characteristics of the input image. On each line the interpolation is performed by a weighted combination of the pixels on the right and left sides of the object.

Figure 4:
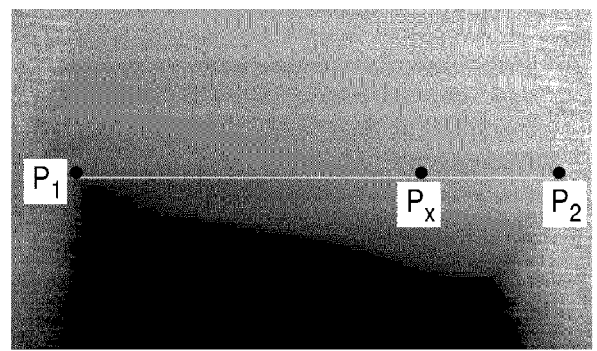
FIG. 4 is an image with overlaid line diagram depicting linear interpolation according to an embodiment of the technology presented.

FIG. 4 depicts an example of horizontal linear interpolation of $P_x$ along a horizontal line from color $P_1$ on the left to color $P_2$ on the right. The following equations describe an embodiment of this linear interpolation, for each of the colors in an RGB color model:

$$R(P_x) = \alpha R(P_1) + (1-\alpha) R(P_2),$$

$$G(P_x) = \alpha G(P_1) + (1-\alpha) G(P_2),$$

$$B(P_x) = \alpha B(P_1) + (1-\alpha) B(P_2),$$

wherein the value $\alpha$ is given by:

$$\alpha = \frac{|P_x - P_2|}{|P_2 - P_1|},$$

where $|P_x - P_2|$ represents the distance between $P_x$ and $P_2$, and $|P_2 - P_1|$ represents the distance between $P_2$ and $P_1$. It should be appreciated that the RGB model is provided by way of example and not limitation, as the general technique is applicable to any other color model.

Next, a low pass filter (e.g., an averaging filter) is applied on the linear-interpolated downsampled image to smooth out the horizontal lines. After filtering, the resultant interpolation is then upsampled back to the original size.

The present disclosure also performs frequency decomposition for patch matching. As has been described above, details and texture patterns may be lost in the color interpolation process. In order to synthesize the details, patch matching is applied on the detail layer and then the average color is adjusted.

Figure 5:
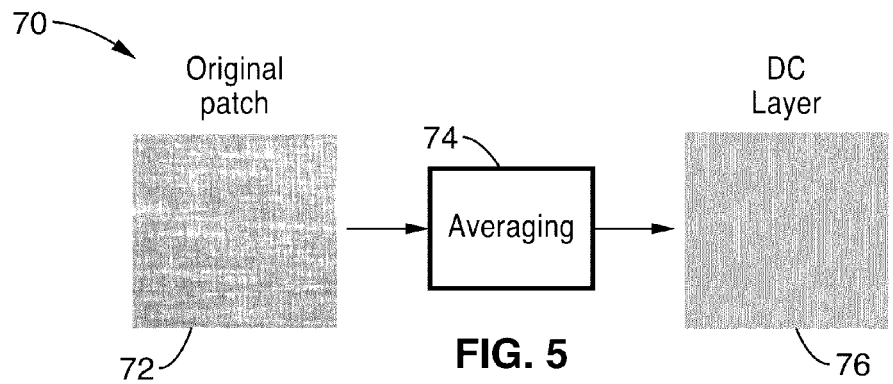
FIG. 5 is a flow diagram of averaging of original patches to a DC layer according to an embodiment of the technology presented.

FIG. 5 illustrates an example embodiment 70 of the results of computing the DC value of a patch through averaging, wherein an original patch 72 is received for averaging 74 and outputs a DC layer 76, that is a layer which has lost details (i.e., list all its frequency components except for its DC component).

Figure 6:
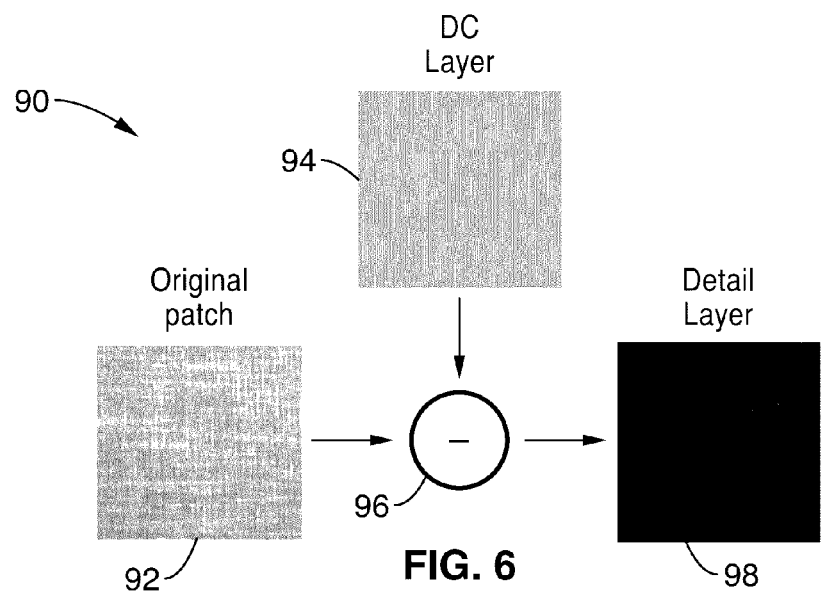
FIG. 6 is a flow diagram of generation of a detail layer from the original patch and the DC layer according to an embodiment of the technology presented.

FIG. 6 illustrates an example embodiment 90 of computing the detail layer that contains higher frequencies (i.e., all frequencies other than the DC value) in response to taking the difference 96 between the original patch 92 and DC layer 94 to output a detail layer 98. Thus, the target and all the candidate patches are decomposed into DC layer (average RGB) and detail layer.

To make sure that the target patch is filled from a visually similar region, the present disclosure in at least one embodiment utilizes a DC color criteria. The DC layer of the target patch is compared to the DC layer of the candidate patch; if the DC layers (average colors) are substantially different, the candidate patch is rejected. The result is an improved visual quality that encourages patches to be filled from similar regions. This mechanism also accelerates the patching process by pruning the number of candidate patches.

Patch matching is performed only on the detail layers of the target and remaining candidate patches. After finding the best matching patch, the DC layer of the patch at the location of the target patch in the color-interpolated image is added to the detail layer of the best match.

The disclosed method clips certain pixel values. During DC adjustment, some pixel values may go out of the valid range. To prevent this, the instruction steps executed on the computer processor perform clipping these RGB values to the valid range before assigning them to a pixel.

Figure 7A:
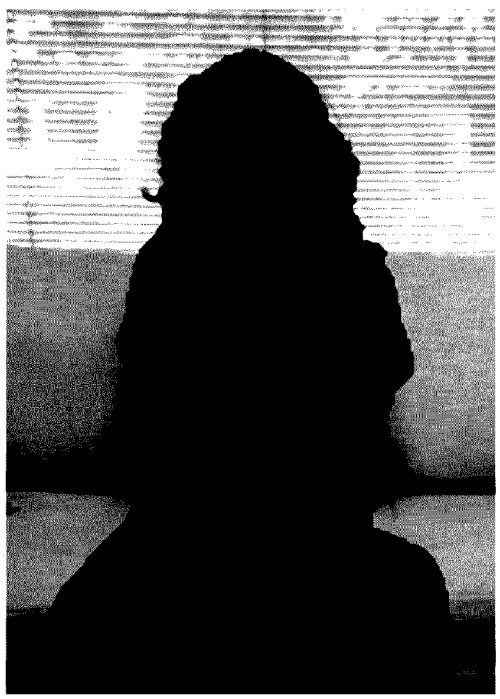
FIG. 7A through FIG. 7C are inpainting results for an original image in which a hole was created by removing a sitting person from the image (FIG. 7A), shown according to an embodiment of the technology presented (FIG. 7B), and without that approach (FIG. 7C).
Figure 7B:
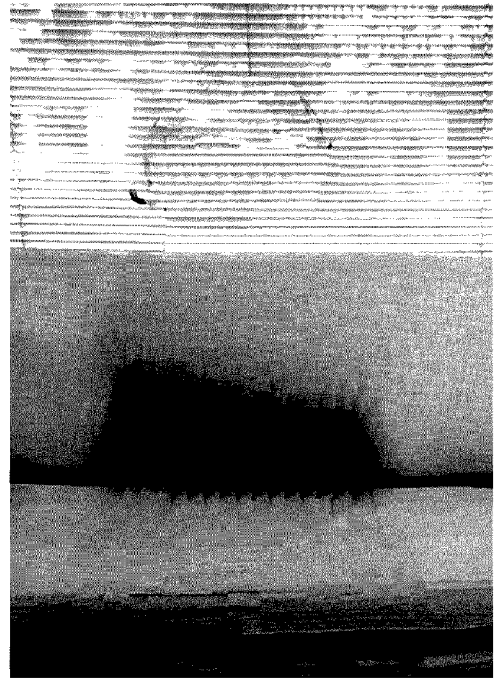
Figure 7C:
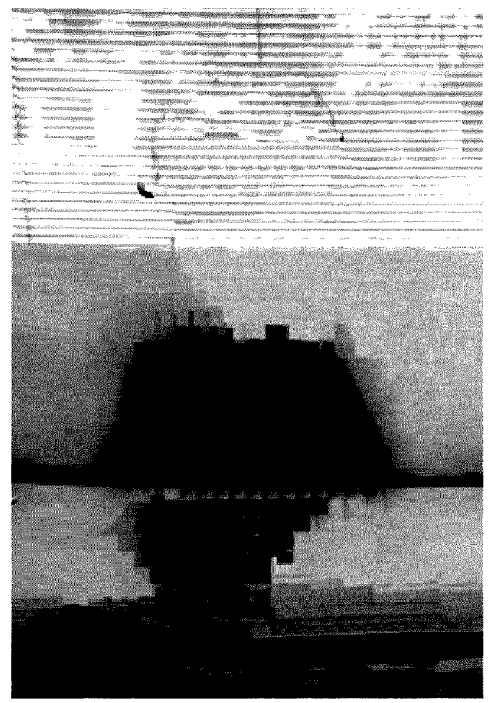

FIG. 7A illustrates an example of an original image of a person sitting on a couch in front of a window, in which the person has been removed leaving the silhouette. FIG. 7B illustrates inpainting process performed with the disclosed technology which uses frequency decomposition, while FIG. 7C depicts the results without using the proposed technique. It is readily apparent that FIG. 7B using the described techniques has significantly reduced the number of artifacts.

Embodiments of the present disclosure may be described with reference to flowchart illustrations of methods and systems according to embodiments of the disclosure, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that "programming" as used herein refers to one or more instructions that can be executed by a processor to perform a function as described herein. The programming can be embodied in software, in firmware, or in a combination of software and firmware. The programming can be stored local to the device in non-transitory media, or can be stored remotely such as on a server or all or a portion of the programming can be stored locally and remotely. Programming stored remotely can be downloaded (pushed) to the device by user initiation, or automatically based on one or more factors. It will further be appreciated that as used herein, that the terms processor, central processing unit (CPU), and computer are used synonymously to denote a device capable of executing the programming and communication with input/output interfaces and/or peripheral devices.

From the description herein, it will be appreciated that that the present disclosure encompasses multiple embodiments which include, but are not limited to, the following:

1. An apparatus for synthesizing image regions, comprising: (a) a computer processor configured for receiving an image; (b) a memory storing instructions; and (c) said instructions executed by the computer processor performing steps comprising: (c)(i) performing color interpolation for an object region which has been removed from an image so that an average of the patches being added to the object region matches averages of weighted combination of the pixels on periphery of the object region, toward providing a smooth transition from one side of the object region to the other side of the object region; (c)(ii) performing patch matching in response to frequency decomposition when generating patches to infill the object region; and (c)(iii) generating an output image having synthesized image regions.

2. The apparatus of any preceding embodiment, wherein said instructions executed by the computer process are configured for performing patch matching at the detail layer, comprising: (a) averaging an original patch to provide a DC layer; (b) generating a detail layer in response to the difference between the original patch and the DC layer; and (c) receiving the detail layer for patch matching, whose patch output is summed with said DC layer at location of target patch in said object region, to infill a patch at that location in the image.

3. The apparatus of any preceding embodiment, wherein said instructions executed by the computer process are configured for performing patch matching, comprising: (a) averaging color matching between candidate patches and target patches to reject candidate patches whose average is not close to that of the target patch; (b) subtracting average color from non-rejected candidates and from the target patch to generate first and second detail layers; (c) matching detail layers from said first and second detail layers to select and output a best matching patch among non-rejected matching patches; (d) averaging color adjustment of best matching patch as a fill patch for the object region; and (e) repeating steps (a) through (d) until the object region has been filled with patches.

4. The apparatus of any preceding embodiment, wherein said instructions executed by the computer processor are configured for performing color interpolation at a reduced resolution, and then upscaling the image after color interpolation.

5. The apparatus of any preceding embodiment, wherein said instructions executed by the computer processor are configured for performing color interpolation as a linear interpolation.

6. The apparatus of any preceding embodiment, wherein said instructions executed by the computer processor is further configured for low pass filtering the interpolated object region to smooth it out.

7. The apparatus of any preceding embodiment, wherein said instructions executed by the computer processor is further configured for clipping pixel values during DC adjustment to prevent values from going out of a valid range.

8. The apparatus of any preceding embodiment, further comprising an image sensor configured for capturing an image in digital format.

9. The apparatus of any preceding embodiment, further comprising a display adapted for displaying a captured image.

10. The apparatus of any preceding embodiment, further comprising a user interface configured for selecting changes to be made on the captured image displayed on said display.

11. An apparatus for synthesizing image regions in an electronic image capture and manipulation device, comprising: (a) an image sensor configured for capturing an image in digital format; (b) a display adapted for displaying a captured image; (c) a user interface configured for selecting changes to be made on the captured image output on said display; and (d) a digital image processing circuit configured for receiving the captured digital image and performing image processing to manipulate the captured digital image including synthesizing at least one object region therein by steps including: (d)(i) performing color interpolation for the object region which has been removed from the captured digital image so that an average of patches being added to the object region matches averages of weighted combination of the pixels on periphery of the object region, toward providing a smooth transition from one side of the object region to the other side of the object region; (d)(ii) performing patch matching in response to frequency decomposition when generating patches to infill the object region to generate an output image having synthesized image regions; and (d)(iii) generating an output image on said display having synthesized image regions.

12. The apparatus of any preceding embodiment, wherein said digital image processing circuit is further configured for performing patch matching at the detail layer, comprising: (a) averaging an original patch to provide a DC layer; (b) generating a detail layer in response to a difference between the original patch and the DC layer; and (c) receiving the detail layer for patch matching, whose patch output is summed with said DC layer at location of target patch in said object region, to infill a patch at that location in the image.

13. The apparatus of any preceding embodiment, wherein said digital image processing circuit is configured for performing patch matching, comprising: (a) averaging color matching between candidate patches and target patches to reject candidate patches whose average is not close to that of the target patch; (b) subtracting average color from non-rejected candidates and from the target patch to generate first and second detail layers; (c) matching detail layers from said first and second detail layers to select and output a best matching patch among non-rejected matching patches; (d) averaging color adjustment of best matching patch as a fill patch for the object region; and (e) repeating steps (a) through (d) until the object region has been filled with patches.

14. The apparatus of any preceding embodiment, wherein said digital image processing circuit is configured for performing color interpolation at a reduced resolution, and then upscaling the digital image after color interpolation.

15. The apparatus of any preceding embodiment, wherein said digital image processing circuit is configured for performing color interpolation as a linear interpolation.

16. The apparatus of any preceding embodiment, wherein said digital image processing circuit is further configured for low pass filtering the interpolated object region to smooth it out.

17. The apparatus of any preceding embodiment, wherein said digital image processing circuit is further configured for clipping pixel values during DC adjustment to prevent values from going out of a valid range.

18. A method for synthesizing image regions when processing a captured digital image, comprising: (a) capturing a digital image; (b) displaying a captured digital image; (c) collecting input from a user indicating objects to be manipulated in the captured digital image; (d) manipulating the captured digital image including moving or removing objects as indicated by the user and synthesizing a region from where the object was removed; (e) synthesizing homogeneous regions in an object region of said digital image which has been removed from an image so that patches being added to the object region provide a smooth transition from one side of the object region to the other side of the object region; (f) performing patch matching in response to frequency decomposition when generating patches to infill the object region; and (g) displaying the captured digital image with the synthesized region, or regions.

19. The method of any preceding embodiment, wherein patch matching is performed at the detail layer, comprising: (a) averaging an original patch to provide a DC layer; (b) generating a detail layer in response to the difference between the original patch and the DC layer; and (c) receiving the detail layer for patch matching, whose patch output is summed with said DC layer at location of target patch in said object region, to infill a patch at that location in the digital image.

20. The method of any preceding embodiment, wherein said patch matching, is performed comprising: (a) averaging color matching between candidate patches and target patches to reject candidate patches whose average is not close to that of the target patch; (b) subtracting average color from non-rejected candidates and from the target patch to generate first and second detail layers; (c) matching detail layers from said first and second detail layers to select and output a best matching patch among non-rejected matching patches; (d) averaging color adjustment of best matching patch as a fill patch for the object region; and (e) repeating steps (a) through (d) until the object region has been filled with patches.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for synthesizing image regions, comprising:
   (a) a computer processor configured for receiving an image;
   (b) a memory storing instructions; and
   (c) said instructions executed by the computer processor performing steps comprising:
      (i) performing color interpolation for an object region which has been removed from an image so that an average of the patches being added to the object region matches averages of weighted combination of the pixels on a periphery of the object region, toward providing a smooth transition from one side of the object region to the other side of the object region;
      (ii) performing patch matching in response to frequency decomposition when generating patches to infill the object region; and
      (iii) generating an output image having synthesized image regions.

2. The apparatus as recited in claim 1, wherein said instructions executed by the computer processor are configured for performing patch matching at the detail layer, comprising:
   (a) averaging an original patch to provide a DC layer;
   (b) generating a detail layer in response to the difference between the original patch and the DC layer; and (c) receiving the detail layer for patch matching, whose patch output is summed with said DC layer at a location of target patch in said object region, to infill a patch at that location in the image.

3. The apparatus as recited in claim 1, wherein said instructions executed by the computer processor are configured for performing patch matching, comprising:
   (a) averaging color matching between candidate patches and target patches to reject candidate patches whose average is not close to that of the target patch;
   (b) subtracting average color from non-rejected candidates and from the target patch to generate first and second detail layers;
   (c) matching detail layers from said first and second detail layers to select and output a best matching patch among non-rejected matching patches;
   (d) averaging color adjustment of best matching patch as a fill patch for the object region; and
   (e) repeating steps (a) through (d) until the object region has been filled with patches.

4. The apparatus as recited in claim 1, wherein said instructions executed by the computer processor are configured for performing color interpolation at a reduced resolution, and then upscaling the image after color interpolation.

5. The apparatus as recited in claim 1, wherein said instructions executed by the computer processor are configured for performing color interpolation as a linear interpolation.

6. The apparatus as recited in claim 5, wherein said instructions executed by the computer processor is further configured for low pass filtering the interpolated object region to smooth it out.

7. The apparatus as recited in claim 1, wherein said instructions executed by the computer processor is further configured for clipping pixel values during DC adjustment to prevent values from going out of a valid range.

8. The apparatus as recited in claim 1, further comprising an image sensor configured for capturing an image in digital format.

9. The apparatus as recited in claim 1, further comprising a display adapted for displaying a captured image.

10. The apparatus as recited in claim 9, further comprising a user interface configured for selecting changes to be made on the captured image displayed on said display.

11. An apparatus for synthesizing image regions in an electronic image capture and manipulation device, comprising:
   (a) an image sensor configured for capturing an image in digital format;
   (b) a display adapted for displaying a captured image;
   (c) a user interface configured for selecting changes to be made on the captured image output on said display; and
   (d) a digital image processing circuit configured for receiving the captured digital image and performing image processing to manipulate the captured digital image including synthesizing at least one object region therein by steps including:
      (i) performing color interpolation for the object region which has been removed from the captured digital image so that an average of patches being added to the object region matches averages of weighted combination of the pixels on a periphery of the object region, toward providing a smooth transition from one side of the object region to the other side of the object region;
      (ii) performing patch matching in response to frequency decomposition when generating patches to infill the object region to generate an output image having synthesized image regions; and
      (iii) generating an output image on said display having synthesized image regions.

12. The apparatus as recited in claim 11, wherein said digital image processing circuit is further configured for performing patch matching at the detail layer, comprising:
   (a) averaging an original patch to provide a DC layer;
   (b) generating a detail layer in response to a difference between the original patch and the DC layer; and
   (c) receiving the detail layer for patch matching, whose patch output is summed with said DC layer at location of target patch in said object region, to infill a patch at that location in the image.

13. The apparatus as recited in claim 11, wherein said digital image processing circuit is configured for performing patch matching, comprising:
   (a) averaging color matching between candidate patches and target patches to reject candidate patches whose average is not close to that of the target patch;
   (b) subtracting average color from non-rejected candidates and from the target patch to generate first and second detail layers;
   (c) matching detail layers from said first and second detail layers to select and output a best matching patch among non-rejected matching patches;
   (d) averaging color adjustment of best matching patch as a fill patch for the object region; and
   (e) repeating steps (a) through (d) until the object region has been filled with patches.

14. The apparatus as recited in claim 11, wherein said digital image processing circuit is configured for performing color interpolation at a reduced resolution, and then upscaling the digital image after color interpolation.

15. The apparatus as recited in claim 11, wherein said digital image processing circuit is configured for performing color interpolation as a linear interpolation.

16. The apparatus as recited in claim 15, wherein said digital image processing circuit is further configured for low pass filtering the interpolated object region to smooth it out.

17. The apparatus as recited in claim 11, wherein said digital image processing circuit is further configured for clipping pixel values during DC adjustment to prevent values from going out of a valid range.

18. A method for synthesizing image regions when processing a captured digital image, comprising:
   (a) capturing a digital image;
   (b) displaying a captured digital image;
   (c) collecting input from a user indicating objects to be manipulated in the captured digital image;
   (d) manipulating the captured digital image including moving or removing objects as indicated by the user and synthesizing a region from where the object was removed;
   (e) synthesizing homogeneous regions in an object region of said digital image which has been removed from an image so that patches being added to the object region provide a smooth transition from one side of the object region to the other side of the object region;
   (f) performing patch matching in response to frequency decomposition when generating patches to infill the object region; and
   (g) displaying the captured digital with the synthesized region, or regions;
   (h) wherein said patch matching is performed at the detail layer, comprising:
      (i) averaging an original patch to provide a DC layer;
      (ii) generating a detail layer in response to the difference between the original patch and the DC layer; and
      (iii) receiving the detail layer for patch matching, whose patch output is summed with said DC layer at location of target patch in said object region, to infill a patch at that location in the digital image.

19. A method for synthesizing image regions when processing a captured digital image, comprising:
   (a) capturing a digital image;
   (b) displaying a captured digital image;
   (c) collecting input from a user indicating objects to be manipulated in the captured digital image;
   (d) manipulating the captured digital image including moving or removing objects as indicated by the user and synthesizing a region from where the object was removed;
   (e) synthesizing homogeneous regions in an object region of said digital image which has been removed from an image so that patches being added to the object region provide a smooth transition from one side of the object region to the other side of the object region;
   (f) performing patch matching in response to frequency decomposition when generating patches to infill the object region; and
   (g) displaying the captured digital with the synthesized region, or regions;
   (h) wherein said patch matching, is performed comprising:
      (i) averaging color matching between candidate patches and target patches to reject candidate patches whose average is not close to that of the target patch;
      (ii) subtracting average color from non-rejected candidates and from the target patch to generate first and second detail layers;
      (iii) matching detail layers from said first and second detail layers to select and output a best matching patch among non-rejected matching patches;
      (iv) averaging color adjustment of best matching patch as a fill patch for the object region; and
      (v) repeating steps (h)(i) through (h)(iv) until the object region has been filled with patches.

* * * * *